United States Patent
Maltsev et al.

(10) Patent No.: US 7,822,128 B2
(45) Date of Patent: Oct. 26, 2010

(54) MULTIPLE ANTENNA MULTICARRIER TRANSMITTER AND METHOD FOR ADAPTIVE BEAMFORMING WITH TRANSMIT-POWER NORMALIZATION

(75) Inventors: Alexander A. Maltsev, Nizhny Novgorod (RU); Alexei V. Davydov, Nizhny Novgorod (RU); Qinghua Li, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1027 days.

(21) Appl. No.: 11/004,720

(22) Filed: Dec. 3, 2004

(65) Prior Publication Data
US 2006/0120469 A1    Jun. 8, 2006

(51) Int. Cl.
H04K 1/10    (2006.01)
(52) U.S. Cl. ............... 375/260; 375/267; 375/349; 455/434; 455/41.2
(58) Field of Classification Search .......... 375/260, 375/267, 349; 455/41.2, 434
See application file for complete search history.

(56) References Cited

U.S. PATENT DOCUMENTS

| 6,141,393 | A | 10/2000 | Thomas et al. |
|---|---|---|---|
| 6,396,886 | B1 | 5/2002 | Kapoor |
| 6,473,467 | B1 | 10/2002 | Wallace et al. |
| 7,068,981 | B2 | 6/2006 | Sim |
| 7,092,436 | B2 | 8/2006 | Ma et al. |
| 7,123,887 | B2 | 10/2006 | Kim et al. |
| 7,139,340 | B2 | 11/2006 | Scarpa |
| 7,649,861 | B2 | 1/2010 | Maltsev et al. |
| 2001/0033622 | A1 | 10/2001 | Jöngren et al. |
| 2002/0051433 | A1 * | 5/2002 | Affes et al. ............... 370/335 |
| 2002/0154716 | A1 | 10/2002 | Erving et al. |
| 2003/0036359 | A1 | 2/2003 | Dent et al. |
| 2003/0095508 | A1 | 5/2003 | Kadous et al. |
| 2003/0128658 | A1 | 7/2003 | Walton et al. |
| 2003/0181170 | A1 | 9/2003 | Sim |
| 2003/0185179 | A1 | 10/2003 | Inogai et al. |
| 2003/0232601 | A1 | 12/2003 | Uno |
| 2004/0002364 | A1 | 1/2004 | Trikkonen et al. |
| 2004/0087324 | A1 | 5/2004 | Ketchum et al. |
| 2004/0120409 | A1 | 6/2004 | Yasotharan et al. |

(Continued)

FOREIGN PATENT DOCUMENTS

EP    1416688 A1    5/2004

(Continued)

OTHER PUBLICATIONS

Bangerter, B., et al., "Wireless Technologies: High-Throughput Wireless LAN Air Interface", *Intel Technology Journal*, 7(3), (Aug. 19, 2003), 47-57.

(Continued)

*Primary Examiner*—Shuwang Liu
*Assistant Examiner*—Kabir A Timory
(74) *Attorney, Agent, or Firm*—Schwegman, Lundberg & Woessner, P.A.

(57) ABSTRACT

In a multi-antenna, multicarrier transmitter, a multicarrier communication signal is generated by normalizing beamforming matrices based on an average subcarrier power loading for each of the transmit antennas. One or more spatial streams may be transmitted by two or more antennas.

10 Claims, 6 Drawing Sheets

U.S. PATENT DOCUMENTS

| | | | |
|---|---|---|---|
| 2004/0120411 | A1 | 6/2004 | Walton et al. |
| 2005/0047518 | A1 | 3/2005 | Auer |
| 2005/0078763 | A1* | 4/2005 | Choi et al. .................. 375/267 |
| 2005/0111538 | A1 | 5/2005 | Wernaers |
| 2005/0243937 | A1 | 11/2005 | Legouable et al. |
| 2005/0287978 | A1 | 12/2005 | Maltsev et al. |
| 2006/0072677 | A1* | 4/2006 | Kwak et al. .................. 375/260 |
| 2006/0092054 | A1* | 5/2006 | Li et al. ......................... 341/67 |
| 2006/0105767 | A1* | 5/2006 | Kim ............................. 455/434 |
| 2006/0114816 | A1 | 6/2006 | Maltsev et al. |
| 2006/0258403 | A1* | 11/2006 | Vaidyanathan ........... 455/562.1 |

FOREIGN PATENT DOCUMENTS

| | | |
|---|---|---|
| WO | WO-2005/029804 A2 | 3/2005 |
| WO | WO-2006/007299 A1 | 1/2006 |
| WO | WO-2006/060241 A1 | 6/2006 |

OTHER PUBLICATIONS

Jöngren, G., et al., "Utilizing Quantized Feedback Information In Orthogonal Space-Time Block Coding", *Proceedings of IEEE Global Telecommunication Conference*, (*GLOBECOM '00*), 2(4), (Nov. 27, 2000), 995-999.

Love, D. J., et al., "Grassmannian Beamforming for Multiple-Input Multiple-Output Wireless Systems", *IEEE Transactions on Information Theory*, 49(10), (Oct. 2003), 2735-2747.

Stephens, A. P., "IEEE 802.11 TGn Comparison Criteria", *IEEE 802.11-02/814r2*, (IEEE P802.11—Wireless LANs),(Nov. 2003), 5 pgs.

"U.S. Appl. No. 10/999,592 Response filed Nov. 30, 2007 in response to Non-Final Office Action mailed Aug. 24, 2007", 19 pgs.

U.S. Appl. No. 10/999,592 "Non-Final Office Action mailed Aug. 24, 2007," 17 pgs.

"U.S. Appl. No. 10/999,592 Response filed Apr. 29, 2008 to Final Office Action mailed Feb. 8, 2008", 12 pgs.

"U.S. Appl. No. 10/999,592, Final Office Action mailed Feb. 8, 2008", 22 Pgs.

"Taiwanese Application No. 94140545 Office Action mailed Nov. 30, 2007", 5 pgs.

"U.S. Appl. No. 10/999,592, Advisory Action mailed May 20, 2008", 3 pgs.

"U.S. Appl. No. 10/999,592, Non-Final Office Action mailed Sep. 23, 2008", 8 pgs.

"U.S. Appl. No. 10/999,592, Response filed Nov. 24, 2008 to Non-Final Office Action mailed Sep. 23, 2008", 12 pgs.

"U.S. Appl. No. 10/999,592 Response filed Nov. 24, 2008 to Non-Final Office Action mailed Sep. 23, 2008", 10 pgs.

"U.S. Appl. No. 10/999,592, Notice of Allowance mailed Sep. 4, 2009", 11 pgs.

* cited by examiner

US 7,822,128 B2

MULTIPLE ANTENNA MULTICARRIER TRANSMITTER AND METHOD FOR ADAPTIVE BEAMFORMING WITH TRANSMIT-POWER NORMALIZATION

TECHNICAL FIELD

Embodiments of the present invention pertain to wireless communications. Some embodiments pertain to multicarrier transmitters with more than one antenna, and some embodiments pertain to antenna beamforming.

BACKGROUND

Many conventional communication systems apply beamforming coefficients to signals before transmission to help compensate for channel conditions. These beamforming coefficients may affect the power generated by the power amplifiers and may result in non-uniform power loading among the antennas and increased nonlinear distortion. Multicarrier communication systems, such as orthogonal frequency division multiplexed (OFDM) systems, are particularly sensitive to nonlinear distortion in their power amplifiers because they transmit multicarrier symbols on a plurality of closely-spaced orthogonal subcarriers. Thus there are general needs for multicarrier transmitters and methods for beamforming that may reduce non-uniform power loading among antennas.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
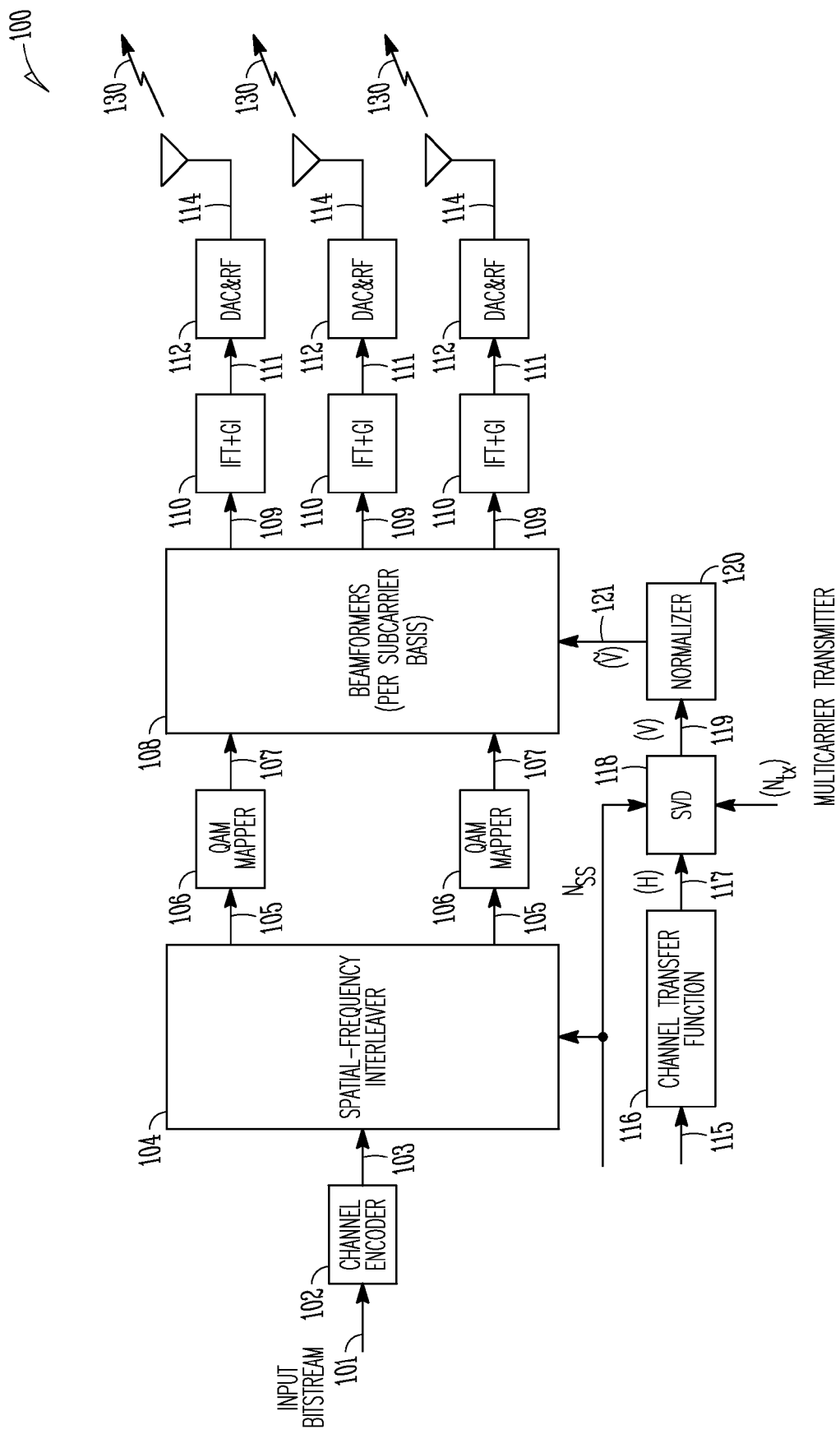
FIG. 1 is a block diagram of a multicarrier transmitter in accordance with some embodiments of the present invention.

FIG. 1 is a block diagram of a multicarrier transmitter in accordance with some embodiments of the present invention. Multicarrier transmitter 100 generates multicarrier communication signals 130 from input bit stream 101 using two or more transmit antennas 114. In some embodiments, multicarrier transmitter 100 may be part of a multiple-input multiple output (MIMO) multicarrier communication system in which two or more transmit antennas 114 are used to convey data streams to a multicarrier receiving station having two or more receive antennas, although the scope of the invention is not limited in this respect. In accordance with some embodiments of the present invention, multicarrier communication signals 130 are generated by normalizing beamforming matrices (V) based on an average subcarrier power loading ($p_k$) for each of transmit antennas 114. The beamforming matrices (V) may have a number of rows equal to the number of transmit antennas and a number of columns equal to the number of spatial streams, although the scope of the invention is not limited in this respect. Each of these matrices may be associated with a given subcarrier or set of subcarriers. In some embodiments, one or more spatial streams may be transmitted by an equal or greater number of antennas. Normalized beamforming matrices ($\tilde{V}$) are applied to symbol-modulated subcarriers in the frequency domain to help reduce non-uniform power loading among transmit antennas 114. These embodiments are described in more detail below.

Multicarrier transmitter 100 may comprise encoder 102 to encode input bit stream 101 and spatial-frequency interleaver 104 to generate one or more spatial streams 105 from encoded bit stream 103. In some embodiments, encoder 102 may be a channel encoder which may add error-checking to the bit stream. In some embodiments, spatial-frequency interleaver 104 may generate one or more spatial streams 105 which may be transmitted together to a multicarrier receiving station with two or more receive antennas. In some embodiments, spatial-frequency interleaver 104 may generate one or more spatial streams 105 by selecting bits of encoded bit stream 103 in some predetermined fashion.

Multicarrier transmitter 100 may also comprise mappers 106 associated with each of spatial streams 105 to map bits of spatial streams 105 to symbols generating symbol streams. In some embodiments, mappers 106 may also map bits of spatial streams 105 to subcarriers associated with a multicarrier communication channel to generate symbol-modulated subcarriers 107 for each of the spatial streams. In some of these embodiments in which a multicarrier communication signal uses forty-eight data subcarriers, each mapper 106 may generate forty-eight corresponding symbol-modulated subcarriers in the frequency domain. These may be referred to as frequency-domain symbol-modulated subcarriers 107. In some embodiments, mappers 106 may comprise quadrature-amplitude-modulation (QAM) mappers, although the scope of the invention is not limited in this respect.

In some embodiments, mappers 106 may map bits in accordance with a modulation assignment that may range from zero bits per symbol to up to ten or more bits per symbol. In some embodiments, the subcarrier modulation level may comprise one or more of binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Modulation levels with higher data communication rates per subcarrier may also be used.

Multicarrier transmitter 100 may also comprise beamformers 108 to apply normalized beamforming matrices ($\tilde{V}$) 121 to frequency-domain symbol-modulated subcarriers 107 of each spatial stream 105 and generate normalized symbol-modulated subcarriers 109 for subsequent transmission by a corresponding one of antennas 114. In some embodiments, normalized symbol-modulated subcarriers 109 may be associated with a particular antenna and antenna stream. In some embodiments, the number of antenna streams may be greater than or equal to the number of spatial streams 105, although the scope of the invention is not limited in this respect. The number of antenna streams may correspond to the number of transmit antennas 114. Although multicarrier transmitter 100 is illustrated with three antenna streams (e.g., each associated with one of the three antennas) and two spatial streams 105, the scope of the invention is not limited in these respects.

Multicarrier transmitter 100 may also comprise inverse Fourier transform (IFT) circuitry 110 for each antenna stream to perform an inverse Fourier transformation on normalized frequency-domain symbol-modulated subcarriers 109 to generate time-domain samples 111. In some embodiments, circuitry 110 may add a guard interval (GI) which may include a cyclic-prefix (CP), to the multicarrier symbols, although the scope of the invention is not limited in this respect.

Multicarrier transmitter 100 may also comprise digital-to-analog conversion (DAC) and radio-frequency (RF) circuitry 112 associated with each antenna stream to digitize and convert time-domain samples 111 to multicarrier signals for subsequent transmission by a corresponding one of antennas 114.

Multicarrier transmitter 100 may also comprise normalizer 120 to normalize beamforming matrices (V) 119 based on an average subcarrier power loading ($p_k$) for each transmit antenna 114. Normalizer 120 may determine the average subcarrier power loading ($p_k$) for each of transmit antennas 114 by averaging the sum of the square of the elements for each of beamforming matrices (V) 119 to generate normalized beamforming matrices ($\tilde{V}$) 121. In these embodiments, normalizer 120 may generate a normalization factor ($n_k$) for each of transmit antennas 114 by dividing an average power loading ($p_0$) over all transmit antennas 114 by the average subcarrier power loading ($p_k$) over all active subcarriers for an associated one of transmit antennas 114, and taking the square root of the result. Average power loading ($p_0$) represents the power radiated by each antenna when this normalization process is performed. The average subcarrier power loading ($p_k$) represents the power radiated by the $k^{th}$ transmit antenna if this normalization process is not performed. In these embodiments, normalizer 120 may apply the appropriate antenna's normalization factor ($n_k$) to each row of beamformer matrices (V) 119 to generate normalized beamformer matrices ($\tilde{V}$) 121. Examples of these calculations are described below.

In some embodiments in which the multicarrier communication signal comprises a plurality of substantially orthogonal subcarriers, each of beamforming matrices (V) 119 may be associated with one of the subcarriers. In these embodiments, normalizer 120 may normalize each of the beamforming matrices (V) 119 to generate a normalized beamformer matrix ($\tilde{V}$) 121 for each subcarrier. In some embodiments, the normalization factor for a particular antenna (k) may be applied to an associated row of each of the beamformer matrices (V) 119. For example, the normalization factor for a first antenna ($n_1$) may be applied to the first row of a beamforming matrix; the normalization factor for a second antenna ($n_2$) may be applied to the second row of that beamforming matrix, etc. In these embodiments, when one beamforming matrix is associated with each subcarrier of the multicarrier signal, the normalization factors for each of the antennas may be applied in this way to each beamforming matrix.

In some embodiments, one of beamformers 108 may be associated with each subcarrier and may apply, for each subcarrier, elements of one of normalized beamformer matrices ($\tilde{V}$) 121 to frequency-domain symbol-modulated subcarriers 107 associated with one or more spatial streams 105 to generate symbol-modulated subcarriers 109 for each transmit antenna 114. In these embodiments, symbol-modulated subcarriers 109 may be associated with a number of antennas 114 which may be greater than or equal to a number of spatial streams 105.

Figure 2:
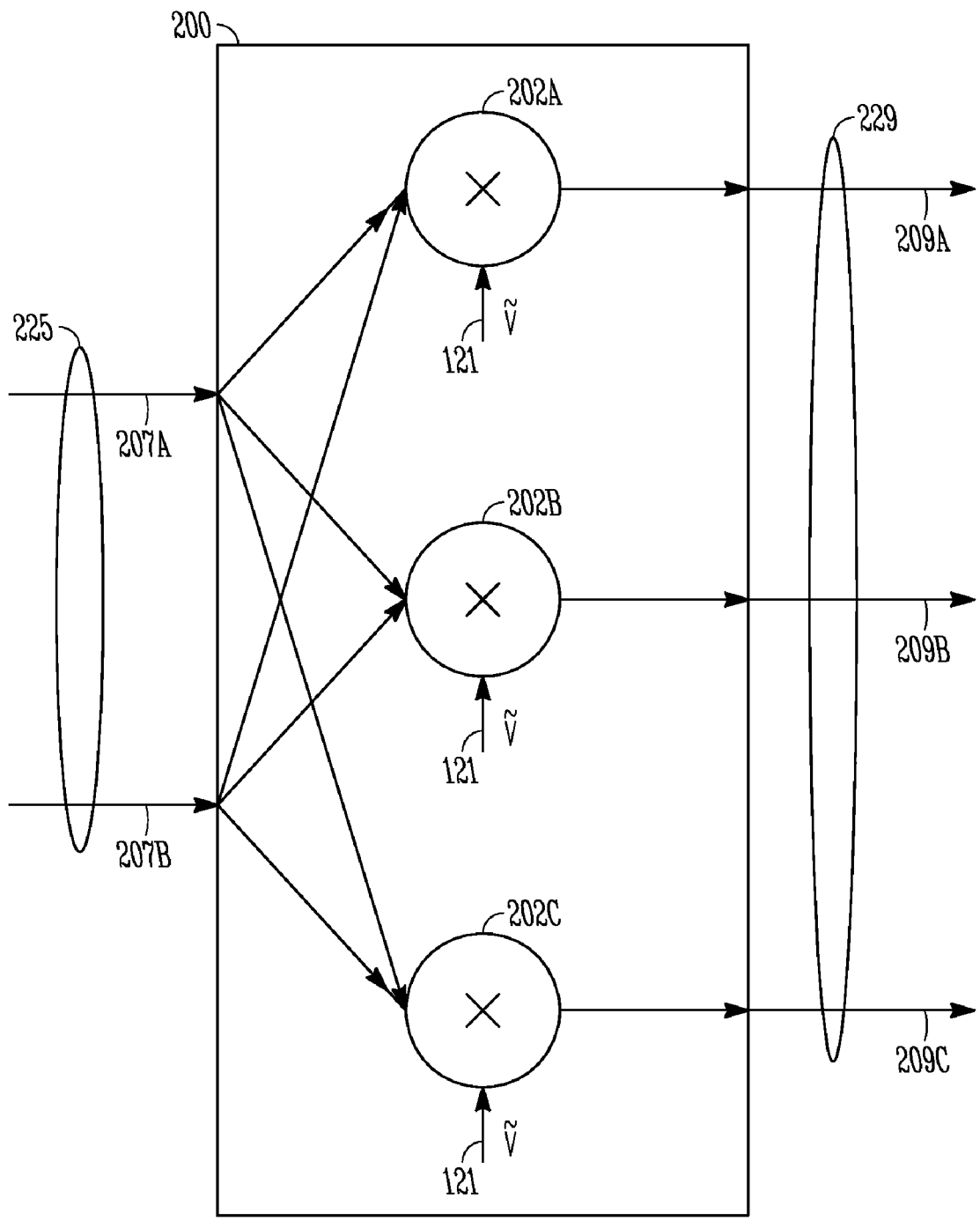
FIG. 2 is a functional diagram of a beamformer in accordance with some embodiments of the present invention.

FIG. 2 is a functional diagram of a beamformer in accordance with some embodiments of the present invention. Beamformer 200 may correspond with one of beamformers 108 (FIG. 1) and may be associated with one of the subcarriers of the multicarrier communication signal. In an example of a multicarrier communication signal having fifty-two total subcarriers, beamformers 108 (FIG. 1) of multicarrier transmitter 100 (FIG. 1) may comprise fifty-two of beamformers 200. In some embodiments, each beamformer 200 may be provided (at least functionally) for one subcarrier of the multicarrier signal. In some embodiments, beamformer 200 weights frequency-domain symbol-modulated subcarriers 207A and 207B of each spatial stream 225 (for an associated subcarrier frequency) to generate two or more antenna streams 229 of symbol-modulated subcarriers 209A, 209B and 209C. Three antenna streams 229 are illustrated, although the scope of the invention is not limited in this respect.

In some embodiments, beamformer 200 may comprise one of weighting elements 202A, 202B and 202C associated with each transmit antenna 114 (FIG. 1) or each of antenna streams 229 as illustrated in FIG. 2. Weighting elements 202A-202C may weight and combine symbol-modulated subcarriers 207A and 207B associated with a corresponding subcarrier by applying elements of one row of normalized beamformer matrix ($\tilde{V}$) 121 associated with a particular antenna and the corresponding subcarrier to generate symbol-modulated subcarriers 209A, 209B and 209C. For example, weighting element 202A may apply a corresponding first row of elements of normalized beamformer matrix ($\tilde{V}$) 121 associated with the first antenna of first antenna stream to combined symbol-modulated subcarriers 207A and 207B associated with a particular subcarrier frequency.

In FIG. 2, symbol-modulated subcarriers 207A and 207B may correspond to symbol-modulated subcarriers 107 (FIG. 1) for two spatial streams. In FIG. 2, weighted symbol-modulated subcarriers 209A, 209B and 209C may correspond to symbol-modulated subcarriers 109 (FIG. 1) for three antenna streams.

Referring back to FIG. 1, in some embodiments, each of transmit antennas 114 may transmit an orthogonal frequency division multiplexed (OFDM) symbol using the same subcarrier frequencies as the other transmit antennas. The OFDM symbols may be generated from symbol-modulated subcarriers 209A, 209B or 209C (FIG. 2) associated with the particular antenna. The OFDM symbols transmitted together by transmit antennas 114 may represent one or more of spatial streams 225 (FIG. 2). In some embodiments, at least two of transmit antennas 114 may be used to transmit at least one of spatial streams 225 (FIG. 2), although the scope of the invention is not limited in this respect.

Multicarrier transmitter 100 may also comprise singular value decomposition (SVD) circuitry 118 to perform a SVD on channel matrix (H) 117 to generate the beamforming matrices (V) 119 for each subcarrier of the multicarrier communication signal. In these embodiments, each element of one of beamforming matrices (V) may be associated with one of spatial streams 225 (FIG. 2) and one of transmit antennas 114. In some embodiments, each beamforming matrix (V) may have a number of columns corresponding with the number of spatial streams ($N_{ss}$) and may have a number of rows associated with the number of transmit antennas ($N_{tx}$). In the case of example multicarrier transmitter 100 illustrated in FIG. 1, there are two spatial steams ($N_{ss}=2$) illustrated as being generated by spatial frequency interleaver 104 and there are three transmit antennas 114 ($N_{tx}=3$). In these embodiments, each beamforming matrix (V) may be a 3×2 matrix. In the example of a multicarrier communication channel that uses fifty-two total subcarrier frequencies (i.e., the number of subcarriers), there may be fifty-two separate beamforming matrices (V) (i.e., one for each active subcarrier), although the scope of the invention is not limited in this respect.

In some embodiments, a multicarrier receiving station may receive multicarrier signals 130 from multicarrier transmitter 100 through a communication channel having characteristics of channel matrix (H) 117. In these embodiments, the multicarrier receiving station may apply a linear processing algorithm to detect the one or more spatial streams. Some examples of some suitable linear processing algorithms include zero-forcing (ZF) and minimum mean-squared-error (MMSE) processing algorithms. In some other embodiments, the multicarrier receiving station may apply non-linear multiple-input, multiple-output (MIMO) equalization techniques to separate one or more of spatial streams 225 (FIG. 2).

In some embodiments, multicarrier transmitter 100 may receive channel matrix (H) 117, which represents the channel transfer function, from the multicarrier receiving station as part of a closed-loop MIMO feedback process. In these embodiments, channel matrix (H) 117 provided by the receiving station may be comprise time-domain representation 115 of a channel matrix (H). In these embodiments, multicarrier transmitter 100 may perform a Fourier transformation (e.g., by element 116) on time-domain representation 115 of the channel transfer function to generate channel matrix (H) 117. In some embodiments, the time-domain representation of the channel transfer function provided by the receiving station may be quantized to reduce the number of bits in the feedback path, although the scope of the invention is not limited in this respect. When the channel transfer function is quantized, it may be represented by sets of a predetermined number of bits. In some alternative embodiments, the multicarrier receiving station may perform an SVD on the channel matrix (H) to generate beamforming vectors comprising one of beamforming matrices (V) 119 for each subcarrier for sending to multicarrier transmitter 100.

In some embodiments, the right singular vectors of an SVD decomposition of channel matrix (H) 117 associated with channel transfer function of a single subcarrier may be used to generate a beamforming matrix (V). In some embodiments, each beamforming matrix (V) 119 may be unitary matrix having a number of rows equaling the number of the transmit antennas ($N_{tx}$), and a number of columns equaling the number of the spatial streams ($N_{ss}$). An example of a beamforming matrix (V) is illustrated below.

$$V = \begin{bmatrix} v_{1,1} & v_{1,2} & \cdots & v_{1,N_{ss}} \\ v_{2,1} & \ddots & & \vdots \\ \vdots & & & \\ v_{N_{tx},1} & v_{N_{tx},2} & \cdots & v_{N_{tx},N_{ss}} \end{bmatrix}_{N_{tx},N_{ss}}$$

In this example, columns of matrix (V) correspond to the number of spatial streams 105 and rows correspond to the number of transmit antennas 114 used for transmission. The use of beamforming matrix (V) before normalization by normalizer 120 may introduce non-uniform power loading among the transmit antennas. This may result in an increased power-amplifier back-off (i.e., from a saturation point) for practical systems, reducing power amplifier efficiency or increasing non-linear distortion.

Figure 3:
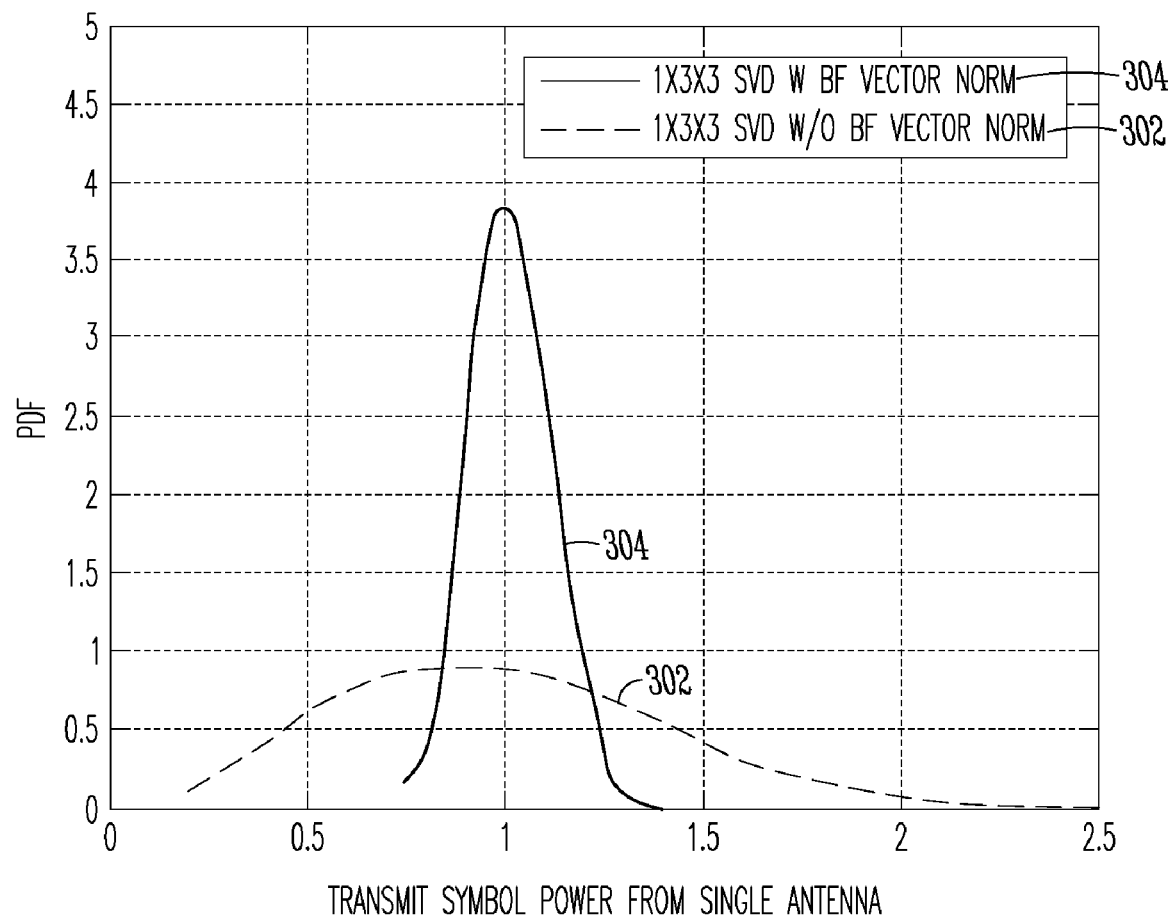
FIG. 3 shows a comparison of average transmit power distributions.

FIG. 3 shows a comparison of average transmit power distributions for an OFDM symbol in a 3×3 MIMO system with one spatial stream. Curve 302 illustrates the average power distribution for a transmitted OFDM symbol when a beamforming matrix (V) without normalization is used and curve 304 illustrates the average power distribution for a transmitted OFDM symbol when a normalized beamforming matrix ($\tilde{V}$) is used. It can be seen that the OFDM symbol average power deviation is high in the non-normalized situation illustrated by curve 302, which can result in significant power amplifier nonlinear distortion. The normalization of the beamforming matrices (V) may help avoid this non-uniform antenna power loading by normalization of the vectors of the beamforming matrices (V).

In some embodiments, after applying SVD decomposition to channel matrix (H) 117 (FIG. 1), normalizer 120 (FIG. 1) may determine from beamforming matrices (V) 119 (FIG. 1) the average per subcarrier power loading for each antenna using equation (1) bel $$p_k = \frac{1}{N_{sc}} \sum_{j=1}^{N_{sc}} \sum_{i=1}^{N_{ss}} |v_{k,i}^j|^2,$$

where k is the antenna index, j is the subcarrier index, i is the spatial stream index, $N_{ss}$ is the number of spatial streams, and $N_{sc}$ is the number of active subcarriers. Normalizer 120 (FIG. 1) may then determine the normalization factor for each antenna using equation (2) below:

$$n_k = \sqrt{\frac{p_0}{p_k}},$$

where parameter $p_0$ is equal to the average signal power radiated on one symbol-modulated subcarrier from a single one of antennas 114 (FIG. 1). Normalizer 120 (FIG. 1) may apply these normalization factors ($n_k$) for each row of the beamforming matrices (V) to generate the normalized beamforming matrices ($\tilde{V}$) using equation (3) below:

$$\tilde{V} = \begin{bmatrix} n_1 & 0 & \cdots & 0 \\ 0 & n_2 & & \vdots \\ \vdots & & \ddots & \\ 0 & \cdots & & n_{N_{tx}} \end{bmatrix} \cdot V.$$

As illustrated by curve 304 (FIG. 3), after normalization and application of normalized beamformer matrices ($\tilde{V}$) 121 (FIG. 1) by beamformers 108 (FIG. 1), the average power deviation may be significantly reduced. Curve 304 shows that the probability of occurrence is centered around one on the x-axis after normalization.

Figure 4:
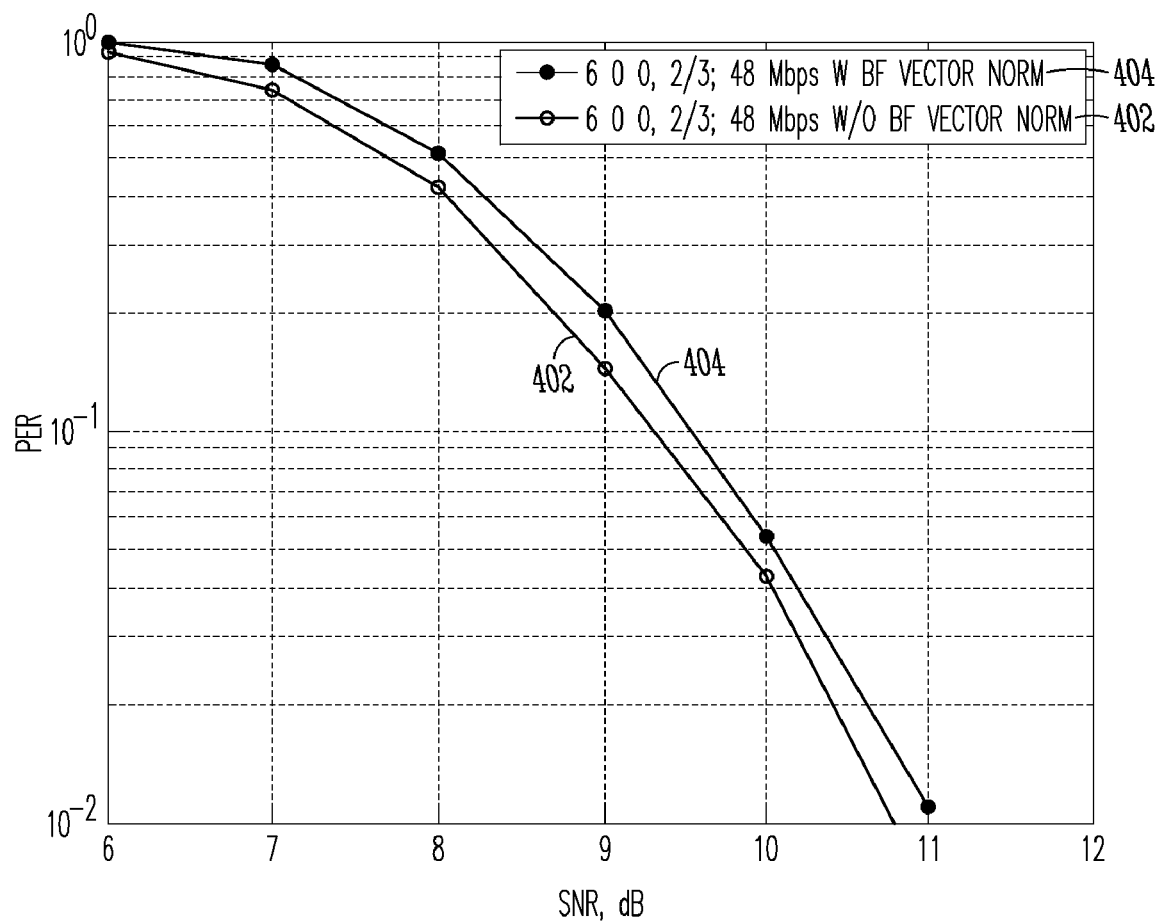
FIG. 4 shows a comparison of packet error rate degradation.

In some embodiments, the normalization of beamforming matrices (V) 119 (FIG. 1) may result in some performance degradation in comparison with ideal SVD beamforming. FIG. 4 shows a comparison of packet error rate degradation between ideal SVD beamforming, illustrated by curve 402, and SVD beamforming with normalization in accordance with some embodiments of the present invention, illustrated by curve 404. Curve 404 illustrates that the normalization of the beamforming matrices may result in negligible performance degradation in comparison with ideal SVD beamforming. In some embodiments, the degradation caused by the normalization of beamforming matrices may be about 0.2 dB or less, although the scope of the invention is not limited in this respect.

Referring back to FIG. 1, although multicarrier transmitter 100 is illustrated as having several separate functional elements, one or more of the functional elements may be combined and may be implemented by combinations of software-configured elements, such as processing elements including digital signal processors (DSPs), and/or other hardware elements. For example, processing elements may comprise one or more microprocessors, DSPs, application specific integrated circuits (ASICs), and combinations of various hardware and logic circuitry for performing at least the functions described herein In some embodiments, the functional elements of multicarrier transmitter 100 illustrated in FIG. 1 may refer to one or more processes operating on one or more processing elements.

In some embodiments, multicarrier transmitter 100 may be part of a wireless communication device, and may transmit multicarrier communication signals, such as orthogonal frequency division multiplexed (e.g., OFDM) communication signals. In some embodiments, transmitter 100 may transmit an OFDM symbol from each antenna 114 on a multicarrier communication channel. The multicarrier communication channel may be within a predetermined frequency spectrum. The multicarrier communication channel may comprise a plurality of orthogonal subcarriers. In some embodiments, the orthogonal subcarriers may be closely spaced OFDM subcarriers. To achieve orthogonality between closely spaced subcarriers, in some embodiments, the subcarriers of the multicarrier communication channel may have a null at substantially a center frequency of the other subcarriers of the multicarrier communication channel, although the scope of the invention is not limited in this respect.

In some embodiments, multicarrier transmitter 100 may communicate with one or more other multicarrier communication stations over an OFDM communication channel. In some embodiments, the OFDM communication channel may comprise one or more spatial channels. Spatial channels may be non-orthogonal channels (i.e., not separated in frequency) in which at least partial orthogonality may be achieved through beamforming and/or antenna diversity. In some embodiments, multicarrier transmitter 100 may transmit three OFDM symbols respectively with three transmit antennas 114, although the scope of the invention is not limited in this respect. An OFDM symbol may be viewed as the combination of the symbols modulated on the individual subcarriers.

In some embodiments, a multicarrier communication channel may have a bandwidth of approximately 20 MHz and may have up to forty-eight or more orthogonal data subcarriers having a spacing therebetween of approximately 312.5 kHz, although the scope of the invention is not limited in this respect. In some embodiments, the frequency spectrums for the multicarrier communication channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier transmitter 100 may be part of a wireless communication device, such as a base station, an access point, a personal digital assistant (PDA), a laptop or portable computer with wireless communication capability, a web tablet, a wireless telephone, a wireless headset, a pager, an instant messaging device, a digital camera, or other device that may receive and/or transmit information wirelessly. In some embodiments, multicarrier transmitter 100 may transmit and/or receive RF communications in accordance with specific communication standards, such as the Institute of Electrical and Electronics Engineers (IEEE) standards including IEEE 802.11(a), 802.11(b), 802.11(g/h) and/or 802.11(n) standards for wireless local area networks (WLANs) and/or 802.16 standards for wireless metropolitan area networks (WMANs), although device 100 may also be suitable to transmit and/or receive communications in accordance with other techniques including the Digital Video Broadcasting Terrestrial (DVB-T) broadcasting standard, and the High performance radio Local Area Network (HiperLAN) standard.

In some embodiments, each transmit antenna 114 may comprise a directional or omnidirectional antenna, including, for example, a dipole antenna, a monopole antenna, a patch antenna, a loop antenna, a microstrip antenna or other type of antenna suitable for reception and/or transmission of multicarrier signals by multicarrier transmitter 100.

Although some embodiments of the present invention are discussed in the context of an 802.11x implementation (e.g., 802.11a, 802.11g, 802.11 HT, etc.), the scope of the present invention is not limited in this respect. Some embodiments of the present invention may be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and the like communication systems.

Figure 5:
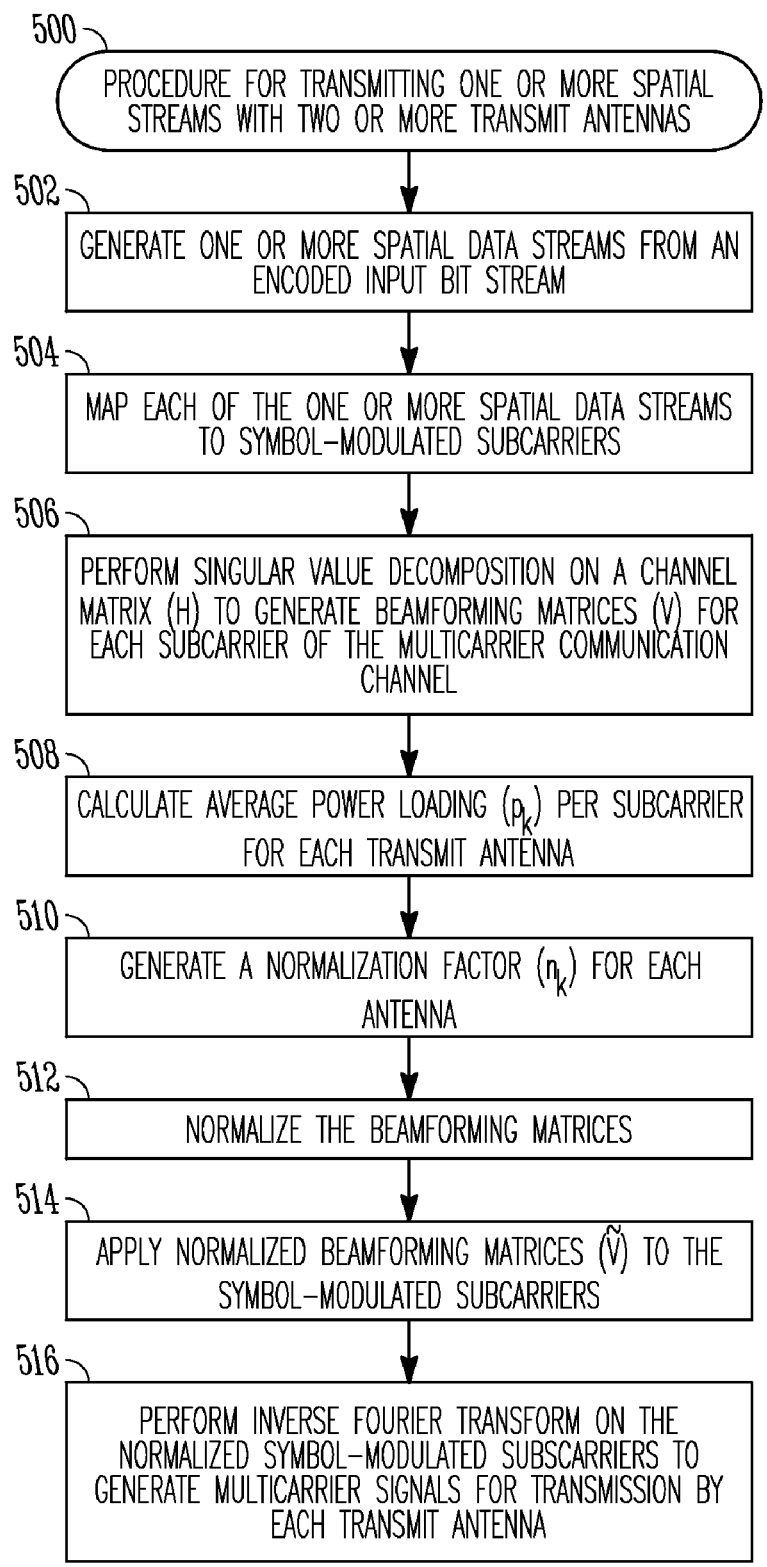
FIG. 5 is a flow chart of a procedure in accordance with some embodiments of the present invention.

FIG. 5 is a flow chart of a procedure in accordance with some embodiments of the present invention. Procedure 500 may be performed by a multicarrier transmitter, such as multicarrier transmitter 100 (FIG. 1), for transmitting one or more spatial streams with two or more transmit antennas. In accordance with procedure 500, normalized beamforming matrices ($\tilde{V}$) are applied to symbol-modulated subcarriers in the frequency domain to help reduce non-uniform power loading among the transmit antennas, such as antennas 114 (FIG. 1).

Operation 502 comprises generating one or more spatial streams from an encoded input bit stream. Operation 502 may be performed by spatial-frequency interleaver 104 (FIG. 1) to generate one or more spatial streams 105 (FIG. 1).

Operation 504 comprises mapping the one or more spatial streams to symbols to generate symbol-modulated subcarriers for each spatial stream. In some embodiments, for each spatial stream, a symbol-modulated subcarrier may be provided for each subcarrier of the multicarrier communication channel. In some embodiments, operation 504 may be performed by mappers 106 (FIG. 1).

Operation 506 comprises performing an SVD on a channel matrix (H) to generate beamforming matrices (V) for each subcarrier of the multicarrier communication channel. In some embodiments, the channel matrix (H) may have been received from a multicarrier receiving station, although the scope of the invention is not limited in this respect. In some embodiments, operation 506 may be performed by SVD circuitry 118 (FIG. 1).

Operation 508 comprises calculating an average subcarrier power loading ($p_k$) for each of the transmit antennas by averaging the sum of the square of the $k^{th}$ row of elements (i.e., the power levels) of each of the beamforming matrices (V). In some embodiments, operation 508 may include using equation (1) (see above) to calculate the average subcarrier power loading ($p_k$) for each of the transmit antennas, although the scope of the invention is not limited in this respect. In some embodiments, operation 508 may be performed by normalizer 120 (FIG. 1).

Operation 510 comprises generating a normalization factor ($n_k$) for each of the transmit antennas by dividing an average signal power ($p_o$) (i.e., the average over all transmit antennas) by the average subcarrier power loading ($p_k$) for an associated one of the transmit antennas. The square root of the result may then be calculated. In some embodiments, operation 510 may use equation (2) (see above), although the scope of the invention is not limited in this respect. In some embodiments, operation 510 may be performed by normalizer 120 (FIG. 1).

Operation 512 comprises normalizing the beamforming matrices (V) to generate normalized beamforming matrices ($\tilde{V}$). In some embodiments, operation 512 may comprise applying the proper antenna's normalization factor ($n_k$) to each row of the beamformer matrices (V) to generate normalized beamformer matrices ($\tilde{V}$). In some embodiments, operation 512 may use equation (3) (see above), although the scope of the invention is not limited in this respect. In some embodiments, operation 512 may be performed by normalizer 120 (FIG. 1).

Operation 514 comprises applying the normalized beamforming matrices ($\tilde{V}$) to symbol-modulated subcarriers. In some embodiments, operation 514 may apply a normalized beamformer matrix ($\tilde{V}$) associated with a particular subcarrier frequency to symbol-modulated subcarriers associated with that particular subcarrier frequency. In some embodiments, the symbol-modulated subcarriers may be combined from one or more spatial streams. In some embodiments, operation 514 may be performed by beamformers 108 (FIG. 1).

Operation 516 comprises performing an inverse Fourier transformation on the normalized symbol-modulated subcarriers for each antenna to generate multicarrier signals for transmission by an associated transmit antenna. In some embodiments, operation 516 may be performed by IFT circuitry 110 (FIG. 1).

Although the individual operations of procedure 500 are illustrated and described as separate operations, one or more of the individual operations may be performed concurrently, and nothing requires that the operations be performed in the order illustrated. In some embodiments, operations 506 through 512 may be performed independently of the other operations. In these embodiments, operation 506 through 512 may generate normalized beamforming matrices ($\tilde{V}$) for application to many sets of frequency-domain samples generated from an input bit or data stream, while operations 502, 504, 514 and 516 may be performed as part of the signal-path processing.

Figure 6:
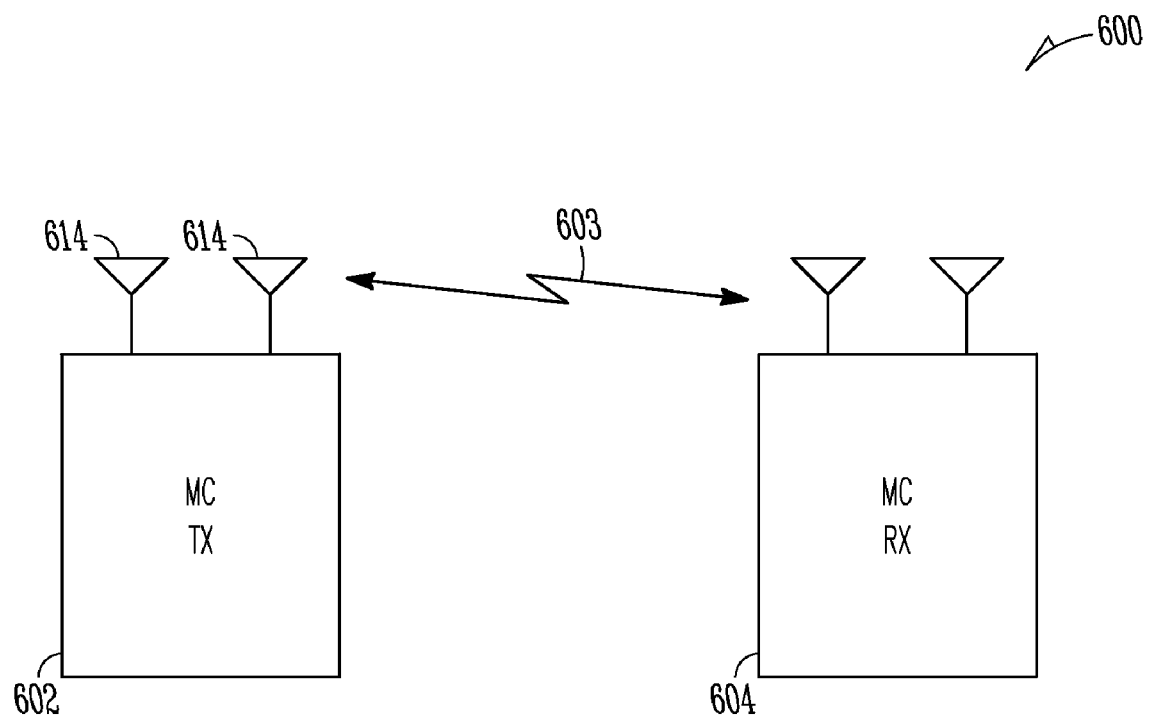
FIG. 6 illustrates a multicarrier communication system in accordance with some embodiments of the present invention.

FIG. 6 illustrates a multicarrier communication system in accordance with some embodiments of the present invention. Multicarrier communication system 600 comprises multicarrier transmitting station 602 and multicarrier receiving station 604 which communicate multicarrier communication signals 603 through a communication channel therebetween. Multicarrier transmitting station 602 may include a multicarrier transmitter, such as multicarrier transmitter 100 (FIG. 1). In some embodiments, multicarrier transmitting station 602 may include a normalizer to normalize beamforming matrices (V) based on an average subcarrier power loading ($p_k$) for each of a plurality of transmit antennas 614. Multicarrier transmitting station 602 may also include beamformers to apply elements of normalized beamforming matrices ($\tilde{V}$) to frequency-domain symbol-modulated subcarriers of a multicarrier communication signal. Multicarrier receiving station 604 may receive multicarrier communication signal 603 through a channel from transmitting station 602. The channel may have characteristics of a channel matrix (H) associated with the beamforming matrices used by transmitting station 602. In some embodiments, multicarrier receiving station 604 may apply a processing algorithm to detect one or more spatial streams transmitted through the channel by multicarrier transmitting station 602.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A multicarrier multiple-input multiple-output (MIMO) transmitter to transmit a multicarrier communication signal comprising two or more spatial streams using a plurality of transmit antennas in accordance with an IEEE 802.11(n) standard, the transmitter comprising:

a singular-value decomposition (SVD) circuitry to receive a channel matrix, a number of transmit antennas (Ntx) and a number (Nss) indicating the number of spatial streams to be transmitted, the SVD circuitry to perform an SVD on the channel matrix and to generate a beamforming matrix for each of a plurality of subcarriers based on the number of transmit antennas (Ntx) and the number of spatial streams (Nss) to be transmitted, each beamforming matrix having dimensions of the number of the transmit antennas by the number of the spatial streams;

a channel transfer function circuitry to provide the channel matrix to the SVD circuitry;

a normalizer to receive the beamforming matrices from the SVD circuitry and to generate a normalization factor for each transmit antenna from an average signal power of the subcarriers associated with each one of the transmit antennas and an average per-subcarrier power loading for said each antenna, the normalizer to normalize the beamforming matrices associated with each of the subcarriers by multiplying the normalization factors and the beamforming matrices to generate a normalized beamforming matrix associated with each subcarrier for each transmit antenna;

a spatial-frequency interleaver to receive an encoded bit stream and the number (Nss) indicating the number of spatial streams to be transmitted, the spatial-frequency interleaver to generate a plurality of spatial streams from the encoded bit stream corresponding to the number of spatial streams (Nss) to be transmitted;

a beamformer for each subcarrier, each beamformer to weight and combine symbol-modulated subcarriers of each of the spatial streams by applying, in the frequency domain, a row of the normalized beamforming matrix associated with a transmit antenna and corresponding subcarrier to generate frequency-domain signals comprising a symbol-modulated subcarrier output for each transmit antenna; and inverse-Fourier transform (IFT) circuitry for each transmit antenna to perform an IFT on the symbol-modulated subcarrier outputs associated with each transmit antenna to generate time-domain signals for transmission, wherein the application of the normalized beamforming matrices to the symbol-modulated subcarriers in the frequency domain reduces non-uniform power loading among transmit antennas.

2. The multicarrier transmitter of claim 1 wherein each beamformer comprises a weighting element associated with each transmit antenna, each weighting element to weight and combine the symbol-modulated subcarriers of each of the spatial streams to generate the symbol-modulated subcarrier output for the associated transmit antenna.

3. The multicarrier transmitter of claim 1 wherein the normalizer is to determine the average per-subcarrier power loading for each of the transmit antennas by averaging a sum of squares of elements of the beamforming matrices associated with one of the transmit antennas, wherein the normalizer is further to generate the normalization factor for each of the transmit antennas by dividing an average signal power associated with the transmit antennas by the average per-subcarrier power loading for an associated one of the transmit antennas, and wherein the normalizer is further to apply the normalization factors to the beamformer matrices to generate the normalized beamformer matrices, the normalization factor to reduce an average power deviation between subcarrier transmissions of an associated transmit antenna.

4. The multicarrier transmitter of claim 3 wherein each element of the beamforming matrices is associated with one of the spatial streams and one of the transmit antennas.

5. The multicarrier transmitter of claim 4 wherein the channel matrix is received from a multicarrier receiving station, and wherein the multicarrier transmitter further comprises circuitry associated with each transmit antenna to transmit a multicarrier time-domain signal generated by the IFT circuitry to the multicarrier receiving station, the multicarrier receiving station to apply a multiple-input, multiple-output equalization technique to separate the spatial streams.

6. A method for transmitting a multicarrier communication signal comprising two or more spatial streams using a plurality of transmit antennas in accordance with an IEEE 802.11 (n) standard, the method comprising:

receiving by a singular-value decomposition (SVD) circuitry, a channel matrix, a number of transmit antennas (Ntx) and a number (Nss) indicating the number of spatial streams to be transmitted;

providing by a channel transfer function circuitry the channel matrix to the SVD circuitry;

performing by the SVD circuitry, an SVD on the channel matrix;

generating by a beamformer, a beamforming matrix for each of a plurality of subcarriers based on the number of transmit antennas (Ntx) and the number of spatial streams (Nss) to be transmitted, each beamforming matrix having dimensions of the number of the transmit antennas by the number of the spatial streams;

generating by a normalizer, a normalization factor for each transmit antenna from an average signal power of the subcarriers associated with each one of the transmit antennas and an average per-subcarrier power loading for said each antenna;

normalizing by the normalizer, the beamforming matrices associated with each of the subcarriers by multiplying the normalization factors and the beamforming matrices to generate a normalized beamforming matrix associated with each subcarrier for each transmit antenna;

receiving by a spatial-frequency interleaver, an encoded bit stream and the number (Nss) indicating the number of spatial streams to be transmitted and generating a plurality of spatial streams from the encoded bit stream corresponding to the number of spatial streams (Nss) to be transmitted;

for each subcarrier, weighting and combining symbol-modulated subcarriers of each of the spatial streams by applying, in the frequency domain, a row of the normalized beamforming matrix associated with a transmit antenna and corresponding subcarrier to generate frequency-domain signals comprising a symbol-modulated subcarrier output for each transmit antenna; and for each transmit antenna, performing an inverse-Fourier transform (IFT) on the symbol-modulated subcarrier outputs associated with each transmit antenna to generate time-domain signals for transmission, wherein the application of the normalized beamforming matrices to the symbol-modulated subcarriers in the frequency domain reduces non-uniform power loading among transmit antennas.

7. The method of claim 6 wherein the weighting and combining comprises weighting and combining the symbol-modulated subcarriers of each of the spatial streams to generate the symbol-modulated subcarrier output for the associated transmit antenna.

8. The method of claim 7 further comprising:

determining the average per-subcarrier power loading for each of the transmit antennas by averaging a sum of squares of elements of the beamforming matrices associated with one of the transmit antennas;

generating the normalization factor for each of the transmit antennas by dividing an average signal power associated with the transmit antennas by the average per-subcarrier power loading for an associated one of the transmit antennas, and applying the normalization factors to the beamformer matrices to generate the normalized beamformer matrices, the normalization factor to reduce an average power deviation between subcarrier transmissions of an associated transmit antenna.

9. The method of claim 8 wherein each element of the beamforming matrices is associated with one of the spatial streams and one of the transmit antennas.

10. The method of claim 9 further comprising receiving the channel matrix from a multicarrier receiving station, and wherein the method is performed by a multicarrier transmitter comprising circuitry associated with each transmit antenna to transmit a multicarrier time-domain signal generated by the IFT circuitry to the multicarrier receiving station, the multicarrier receiving station to apply a multiple-input, multiple-output equalization technique to separate the spatial streams.

* * * * *

UNITED STATES PATENT AND TRADEMARK OFFICE
CERTIFICATE OF CORRECTION

| | | |
|---|---|---|
| PATENT NO. | : 7,822,128 B2 | Page 1 of 1 |
| APPLICATION NO. | : 11/004720 | |
| DATED | : October 26, 2010 | |
| INVENTOR(S) | : Alexander A. Maltsev et al. | |

It is certified that error appears in the above-identified patent and that said Letters Patent is hereby corrected as shown below:

In column 12, line 5, in Claim 3, delete "claim 1" and insert -- claim 2 --, therefor.

Signed and Sealed this
Fifteenth Day of February, 2011

David J. Kappos
*Director of the United States Patent and Trademark Office*